United States Patent [19]
Jensen et al.

[11] Patent Number: 5,131,320
[45] Date of Patent: Jul. 21, 1992

[54] IMAGE-FORMING GRIDDLE

[75] Inventors: Michael E. Jensen, LaGrange Park; Lester E. Langeland, Darien; Gary M. Durkin, Justice, all of Ill.

[73] Assignee: Little Factories, Inc., LaGrange Park, Ill.

[21] Appl. No.: 815,636

[22] Filed: Dec. 23, 1991

Related U.S. Application Data

[63] Continuation of Ser. No. 569,928, Aug. 26, 1990, abandoned.

[51] Int. Cl.⁵ .............................. A47J 37/10
[52] U.S. Cl. ...................... 99/422; 99/376; 99/380; 99/426; 99/430
[58] Field of Search .............. 99/422, 388, 380, 372, 99/376, 381, 424, 425, 426, 430; D7/359, 363-365; 249/134, 135, 140, 117

[56] References Cited

U.S. PATENT DOCUMENTS

| | | | |
|---|---|---|---|
| D. 275,440 | 9/1984 | Matsuhisa | D7/357 |
| D. 277,254 | 1/1985 | Matsuhisa | D7/359 |
| 277,422 | 5/1883 | Harker et al. | 99/380 X |
| 495,872 | 4/1893 | Ball . | |
| 694,745 | 3/1902 | Hall | 99/380 |
| 701,662 | 6/1902 | Zaiser . | |
| 1,336,734 | 4/1920 | DeGraff | 99/380 X |
| 1,556,767 | 10/1925 | Dodge, Jr. | 99/380 X |
| 1,575,825 | 3/1926 | Evans | 99/380 X |
| 2,008,767 | 7/1935 | Munn | 99/425 |
| 2,029,448 | 2/1936 | Tatosian | 99/380 |
| 2,358,452 | 9/1944 | Garstang | 99/380 X |
| 3,107,587 | 10/1963 | Tipton | 93/36 |
| 3,780,978 | 12/1973 | Proul | 249/135 |
| 3,948,159 | 4/1976 | Vigerstrom | 99/358 |
| 4,078,479 | 3/1978 | Mori | 99/422 |
| 4,215,843 | 8/1980 | Gay et al. | 249/78 |
| 4,768,427 | 9/1988 | Cheng | 99/422 |

FOREIGN PATENT DOCUMENTS

| | | | |
|---|---|---|---|
| 576388 | 5/1959 | Canada | 99/422 |
| 47413 | 1/1930 | Norway | 99/422 |

Primary Examiner—Timothy F. Simone
Attorney, Agent, or Firm—Fitch, Even, Tabin & Flannery

[57] ABSTRACT

A cooking utensil with a generally platelike structure and a recessed or raised image respectively defined in or above the griddle surface for providing an image at the surface of a fried foodstuff.

15 Claims, 2 Drawing Sheets

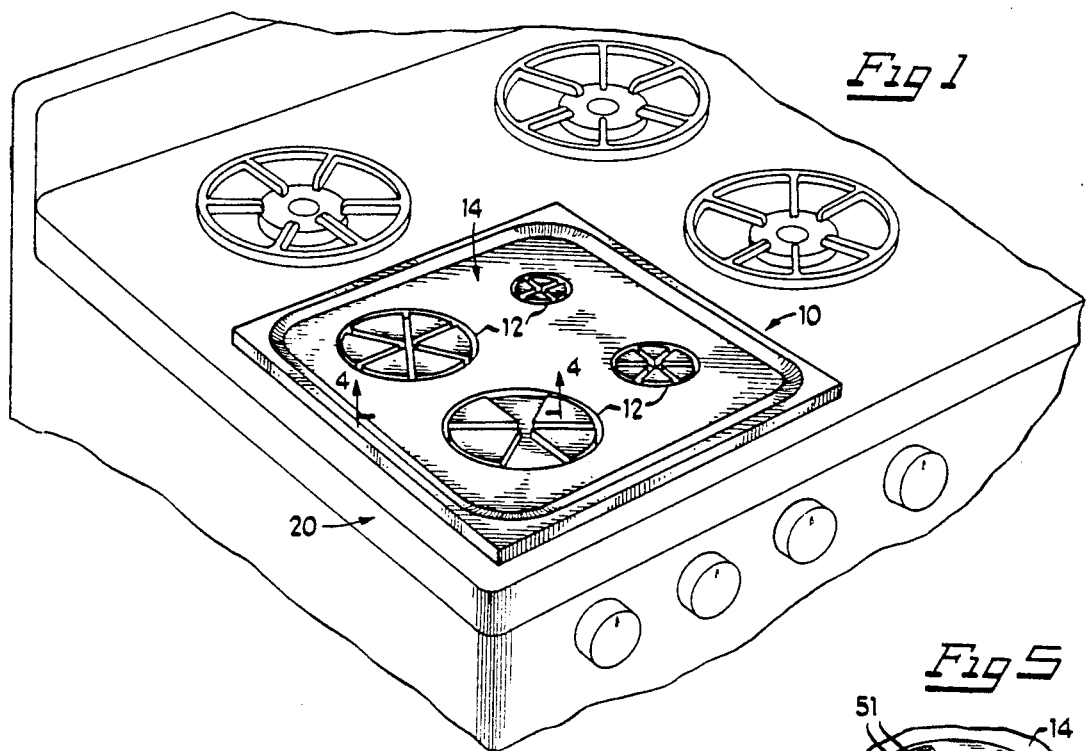
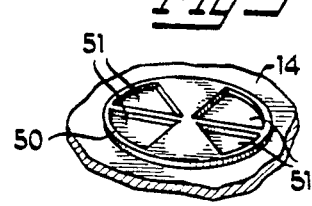
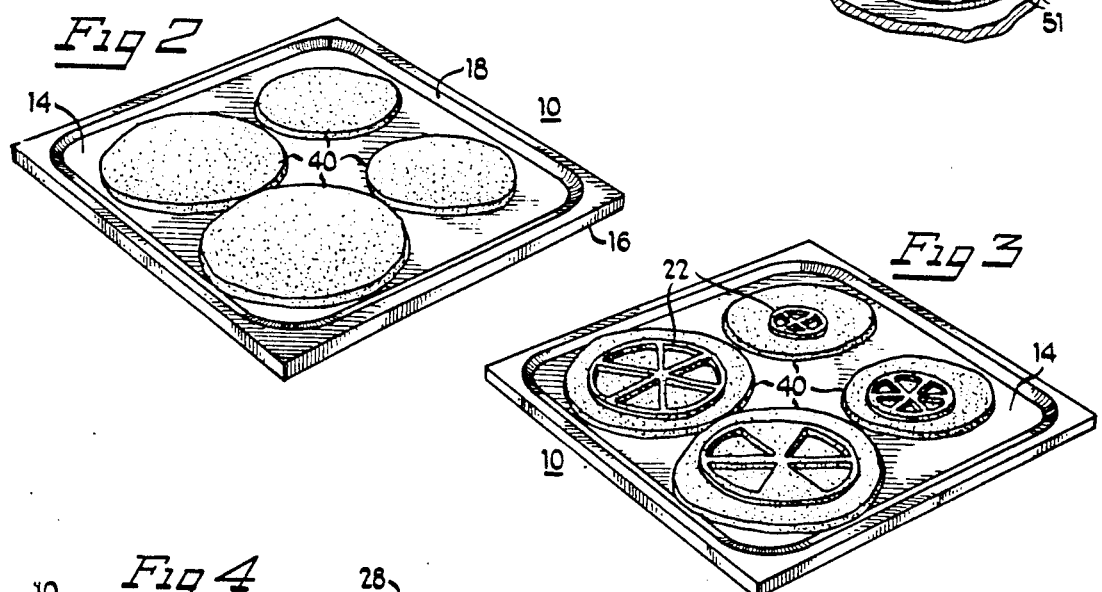
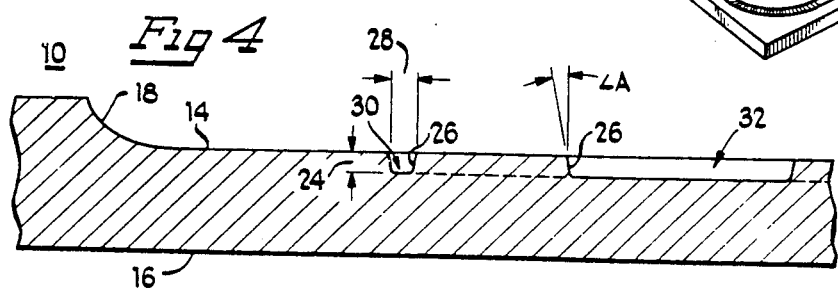

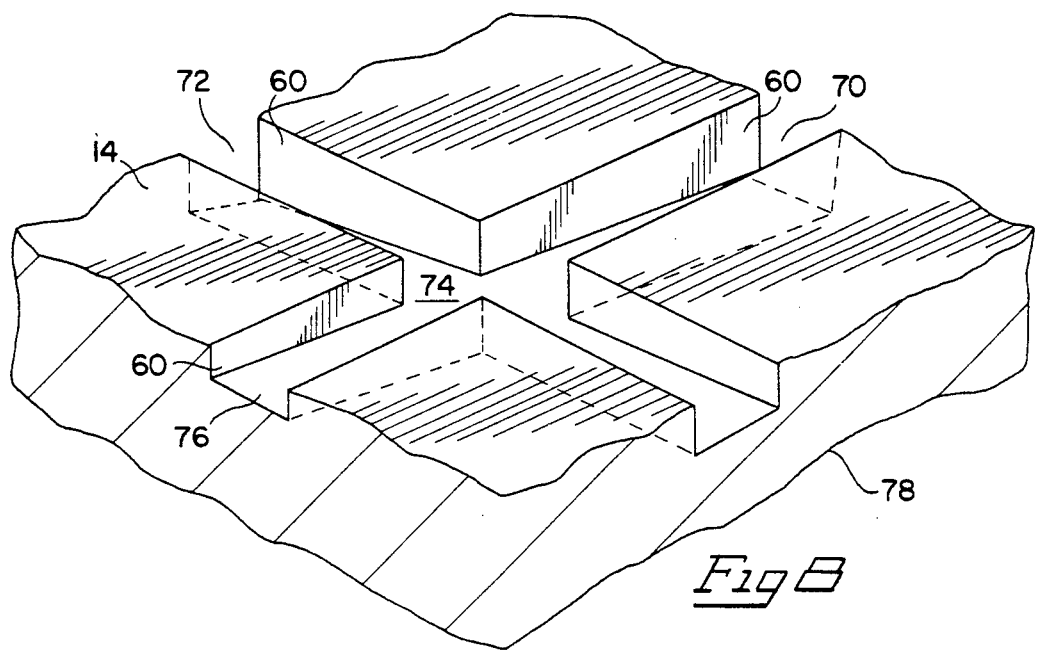
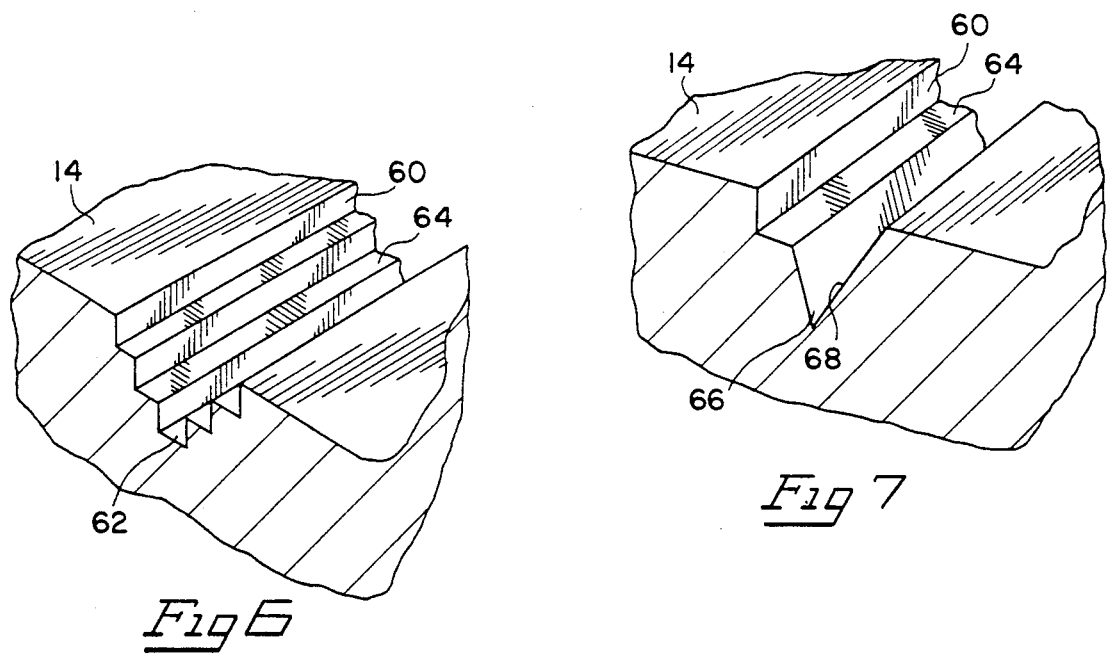

IMAGE-FORMING GRIDDLE

This application is a continuation of application Ser. No. 07/569,928 filed Aug. 20, 1990, now abandoned.

BACKGROUND OF THE INVENTION

The present invention provides a cooking utensil for frying foodstuffs. More particularly a griddle with a contoured image is disclosed for transfer of such image to a fried good.

Griddles are known and utilized for frying various foodstuffs including pancakes, crepes, or fried sandwiches. These foodstuffs are generally fried on both sides to the consistency desired by the chef or baker. The resultant fried product usually has an outer skin or crust layer with a brown-toned surface, which skin is frequently a flat continuum. The cooking surfaces or griddles are flat planar surfaces, which are either positionable over a source of heat or integrally built into an appliance for direct heating by a source of heat. The heat is conducted through the griddle wall thickness to elevate the temperature of the upper surface and a lubricant cooking fluid, grease or release-agent is applied to this surface prior to frying the foodstuff. The release agent merely prevents sticking of the fried food and inhibits burning of the food surface at the griddle surface. However, the flat surfaces do not impose an image on the fried food surface.

A problem generally associated with production of an image on a fried food surface has been the concern of transferring or creating a figure of adequate size, that is, height or depth, and insuring the ability to turn the foodstuff for frying on its second side without destruction of the first-side imposed image. The present invention provides the image in any noted configuration, including character images, numbers or letters. U.S. Pat. No. 4,215,843—Gay et al. illustrates a toy-molding apparatus to produce a molded, shaped object with a surface image. A hot plastic, gelatinous fluid is distributed in a mold cavity to produce the molded, shaped object, however, this is used to bake molded candy forms with a single-sided mold.

Baked foodstuffs, that is, cakes, pies or breads, have been formed in images or configurations by cooking utensils with an appropriate outline-shape. Indicative of such outlined apparatus is the disposable cake pan illustrated in U.S. Pat. No. 3,107,587—C. A. Tipton, wherein a form or foil member is secured on a sheet in an outline of the desired pattern. Thereafter, the cake batter is poured into the form on the sheet and baked to the desired configuration. The particular shape or outline is dependent on the operator or user of this assembly. A similar utilization of outline forms is disclosed in U.S. Pat. No. 3,780,978—Proul, which form is placed on a frying pan or grill for cooking foods. The outline confined foods, such as eggs or batter, are rapidly cooked to form a skin or layer at the lower surface and outer perimeter, which skin permits removal of the outline ring or form while the foodstuff retains the shape of the outline. However, this outline form is not integral with the griddle or frying pan, and thus no image is provided on the fried surfaces. It is unclear whether the foodstuff may be fried or cooked on both sides without disturbing the fluid center portion of the crust surrounded by the already-formed shell of the crust. Thus, it is unclear whether the foodstuff may be fried on both sides without disturbing the outline shape.

A further indication of a baking operation imposing forms on the single-sided surface of a foodstuff is illustrated in U.S. Pat. No. 495,872 to F. J. Ball, which teaches a strawberry shortcake baking pan. As noted therein, the pan is provided with dimples or raised elements in the lower surface of the pan and these dimples mottle the lower surface of the finished baked good to provide seats particularly for strawberries. However, this is a baking arrangement to impose hemispherical indentations in the lower surface of a baked product, which implies a smooth upper surface. Other indications of baked goods with outlines or indentations thereon are provided in U.S. Pat. No. Des. 275,440—Matsuhitsa; and U.S. Pat. No. 701,662—Zeizer, discloses a baker's stencil for imposing printing on the crust of a bread.

Grilling operations are used to make waffles or other fried goods by trapping the foodstuff between two opposed heating surfaces for simultaneous overall cooking of both sides of the fried good. The fried foodstuff has a shaped or grid network from the continuous frying throughout the cooking cycle. However, there is no accommodation for single-sided frying nor for providing other than a grid-like network on the fried surfaces. Illustrative of a similar apparatus with dual heating surfaces for the preparation of particularly preformed foods, such as hamburgers and sausages, is the grilling apparatus disclosed in U.S. Pat. No. 3,948,159—Vigerstrom, wherein sausages of a predetermined shape or hamburgers are simultaneously fried on both sides. The apparatus includes a timer and voltage regulator for cooking and temperature control.

Other apparatus with what appear to be designs or structures on the base of a frying pan are exemplified by the cooking utensil taught in U.S. Pat. No. 4,078,479—Mori, which utilizes a plurality of elevated scallops and arcs distributed about the bottom of a frying pan for more even distribution of heat thereon. However, this is a structure outside the cooking surface.

Although the above apparatus disclose both cooking utensils and baking apparatus, which will form objects into desired shapes, none of the above apparatus will provide a figure in or on the surface of a fried or cooked object, which apparatus will similarly impose an identical image on the second side of the fried good after turning for second-sided frying thereof.

SUMMARY OF THE INVENTION

The present apparatus provides a cooking utensil with an image contoured on its frying surface for transfer of such image to either one or both of the upper and lower surfaces of a foodstuff fried on the frying surface. The image imposed on the fried object is provided by frying the foodstuff on the contoured segment of the griddle surface, which is generally flat and operable with any of the cooking fluids utilized for providing a fluid on a cooking surface for "non-stick" cooking. Alternatively, the foodstuffs may be prepared on non-stick (e.g., TEFLON) surfaces, which may not require the use of a cooking fluid. The food for frying, such as a batter or dough, is placed on the griddle and image surface for frying in a known manner, which imposes a contoured image on or in the fried surface. The fried surface or fried foodstuff may be turned during the cooking cycle for similar image imposition on the second side of the foodstuff, such as a pancake.

BRIEF DESCRIPTION OF THE DRAWINGS

In the figures of the drawing, like reference numerals identify like components, and in the drawing:

FIG. 1 is a perspective view of a griddle with contoured or recessed images on the surface;

FIG. 2 is a perspective view of the griddle in FIG. 1 with a foodstuff thereon;

FIG. 3 illustrates a perspective view of the griddle in FIG. 2 with one side of the foodstuff having an image imposed thereon;

FIG. 4 is an enlarged cross-section of the griddle and contoured portion thereof;

FIG. 5 illustrates a section of the griddle with a raised image-imposing segment thereon;

FIG. 6 is an alternative illustration of an image groove;

FIG. 7 is an illustration of another alternative image groove; and,

FIG. 8 illustrates the intersection of grooves having sloped lower surfaces.

DETAILED DESCRIPTION OF THE PREFERRED EMBODIMENT

In FIG. 1, a griddle 10 for frying foods is generally a flat, platelike surface with a contoured form, which is shown as a spoked wheel 12 on the griddle surface 14. Griddle 10 is illustrated as a generally rectangular shape with a lower surface 16 and a sidewall 18 surrounding the perimeter of upper surface 14. In the figures, sidewall 18 is slightly elevated above upper surface 14, which sidewall generally retains or secures either the lubricants or the foodstuffs on cooking surface 14. A contoured image, which is exemplified by the above-noted spoked-wheel 12, is provided in surface 14 by a plurality of grooves. Although image 12 may be cut into and below surface 14 in a recessed manner as illustrated in the figures, it may also be provided as a raised and contoured portion positioned atop the generally flat surface 14.

Illustrative of an image design is the spoked wheel 12 in FIG. 1, which has both linear and arcuate segments in its configuration. The outline of a particular image (e.g., a portrait) may be provided and in this outline the width of the indentations or raised portions of the outline may vary down to a taper. However, it is most frequent that the lines defining the image are of a uniform width for at least a portion of their distance or length and as shown in FIG. 4, there is a cross-sectional distance at the surface of griddle 14, which is considered to be the groove width 28 of outline 12. The depth 24 or elevation at the above-noted outline groove width 30 is considered to be its deepest point between the parallel line segment, and in a preferred embodiment, the ratio of this width-to-depth should be 1:1. The sidewall in this preferred embodiment tapers from upper surface 14 to the lowest point of the line segment at a 3.5° angle. However, the taper is only provided to enhance removal of the foodstuff, and the wall surface may be of any slope, that is, from a vertical wall to a wall more tapered than this 3.5° angle such as an angle of about 7°, for example. Further, provision for a tapered sidewall enhances manufacture and machining of outline recesses 30 or the alternative elevated portions.

In FIGS. 6-8, some alternative groove configurations are illustrated to note the breadth of varying structures available for the formation of the image. In FIG. 6 a sidewall 26 is tiered with a plurality of steps 60 at fixed elevations below upper surface 14, which steps 60 progress down from surface 14 to the lowest level 62 for defining the groove depth 24. In FIG. 7, a step 60 extending below surface 14 terminates at a plateau 64 and a groove 66 is provided in a griddle 10 below this plateau 64. The sidewalls are sharply tapered to form a V-notch terminating at the floor or notch intersection 66. The second sidewall 68 extends from notch intersection 66 to upper surface 14.

The complexity and interwoven relationships of a multigrooved configuration are shown in FIG. 8 with the intersection of a pair of grooves 70 and 72 at portion 74, which grooves are not necessarily of equal width or depth. Sidewalls 60 of grooves 70 and 72 are illustrated as generally vertically extending from upper surface 14, however, their slope may be of any angle as noted below. The floors 76, 78 of grooves 70, 72, respectively, are illustrated as flat surfaces, which are sloped from front to back and intersect at portion 74. However, the sloped floors 76, 78 may be notched as in FIG. 7 or arcuate as in FIG. 4. The shape of the image groove may vary across the area of the image, but it is not generally determinative of ready removal of the fried good, potential for cooking to the desired consistency or to preservation of the image on the foodstuff after cooling.

Griddles 10 may be any material acceptable for cooking purposes such as iron, steel, aluminum, copper, ceramic, glass or other materials. Further, such griddles may be coated with materials such as TEFLON, or have a surface other than the base material, which may be etched, stained or applied to the base material to provide a surface with greater durability or color enhancement characteristics. Exemplary of such a surface is the commercial hard coating, although it is in fact an anodized coating, which provides an inter-metallic surface, e.g., aluminum oxide. Thus, any ferrous or nonferrous metal or other material, which is acceptable for food usage and has a melting point above 1000° F., would be an acceptable material for griddle 10. The image or outline on surface 14 of griddle 10 may be, as noted above, raised or recessed therein. The preferred embodiment is, in fact, the recessed structure and will be discussed below, although the dimensions and discussion will be equally applicable to a raised outline for producing images.

In the illustrated embodiment of FIG. 4, recessed outline 12 is generally configured utilizing etched or recessed grooves in the surface 14. The particular outline or form is a design choice and includes character or figure outlines, imagery, reliefs, letters or numerals. Image outline 12 may be formed by a network of grooves 30 noted in FIG. 4, which are formed to a particular image. Grooves 30 are not limited to a straight line but may take any path, however, the depth of recess 24 in FIG. 4 must be at least 0.001 inch below surface 14. Further, the depth 24 of groove 30 may be greater than 0.300 inch, but it is preferred that the depth be at least 0.03 inch and most preferably about 0.050 inch.

Sidewall 26 of groove 30 may have any slope, including either a 7° slope, or a zero slope where sidewall 26 is perpendicular to surface 14. However, a sidewall slope of 3.5°, which is noted as angle A in FIG. 4, is preferred for ease of removal of fried dough or batter from grooves 30. Sidewalls 26 bounding groove 30 in FIG. 4 are generally equidistant apart along their length, and although the width of groove 30 is not unlimited in its range, it is preferred that the ratio of groove width 28 to groove depth 24 be about 1:1. It is apparent that groove width and depth ratios generally relate to grooves less than 0.300 inch, rather than the broader openings characterized by gap 32 in FIG. 4. The ratio of width to depth is desired to minimize the effect from narrowly tapered grooves 30, which, although acceptably configured, may tend to pinch the fried food in a tapered portion and inhibit its removal from the contoured image in surface 14.

The imposition of an image on the second and initially unfried surface of the illustrated pancake is accomplished by merely turning the pancake. There is no special tool, spatula or apparatus required to turn the foodstuff to preserve the imposed image, as the lifting of the edge of the foodstuff by a spatula or other means permits turning of the fried good while preserving the image on the fried surface. Turning the fried good and placing the unfried surface on outline image 12 of surface 14 allows frying of the foodstuff second side, shown as pancake 40 in FIGS. 2 and 3.

In FIG. 5 an alternative embodiment, image or outline 12 may be formed by raised elements 50 on griddle surface 14 and the image is impressed into the foodstuff surface rather than raised above the fried surface. The raised elements define grooves 51 formed in the top surface of the raised elements. The raised elements are preferably at least 0.003 inch above the griddle surface 14.

Griddle 10 is provided for frying foods and simultaneously transferring or imposing an image or pattern to the fried surface. The image on the griddle is contoured at the griddle surface and may be either a raised or recessed image at this surface. In addition, the transferred image on the fried food and the surrounding fried surface, even through they are the same foodstuff, are at a color contrast after a normal frying operation. The precise mechanism for this color contrast is not fully understood at this time. This apparatus finds application with pancakes (similarly known as flapjacks, griddle cakes, hot cakes, etc.), sandwiches, and other fried foods. The image-imposing griddle 10 is operable with known and available boxed pancake batters commercially available in supermarkets in pre-mixed conditions (such as BISQUIK), pourable batters, or with various homemade batters of varying consistency. An image may also be provided on other fried objects such as sandwich breads. A lubricant such as cooking oil, butter, grease or other material may be used to inhibit or prevent sticking of foodstuffs to the griddle.

Griddle 10 is generally placed on a source of heat, such as a stove burner 20 in FIG. 1, to increase the temperature of surface 14 to a cooking temperature. The more familiar griddles are in the form of a round or rectangular pan having a handle for placement and removal of the griddle on the source of heat. However, there is no limitation which imposes the portability of such a griddle, as commercial establishments have a permanently fixed frying surface mounted upon a stove or other cooking surface. Cooking, and more particularly frying, a dough or batter-type food on a griddle surface is usually accomplished by applying a lubricant or grease, 30 which may be an oil, grease, butter or spray shortening, to surface 14 and image outline 12 to minimize adherence of the foodstuff to the surface 14. Thereafter, a batter, which is usually a viscous fluid or suspension, is applied to surface 14 and image outline 12. The foodstuff, such as pancake 40 in FIGS. 2 and 3, is initially fried on a first side and then turned with a spatula for frying on the second side. The image from contoured outline 12 is thus imposed on both fried surfaces. The imposition of an image on a fried food surface is accommodated without use of secondary molds, special handling tools or special technique.

Although the above-noted griddle 10 is frequently utilized and associated with the production of pancakes, which are known to be circular or cylindrical foodstuffs, it is not limited to a particular shape or configuration of such pancakes, and the discussion related to these pancake objects are for illustration and not limitation.

While only specific embodiments of the invention have been described and shown, it is apparent that various alterations and modifications can be made therein. It is therefore, the intention in the appended claims to cover all such modifications and alternations as may fall within the scope and spirit of the invention.

What is claimed is:

1. A cooking utensil to provide contoured impressions on a fried foodstuff having central and outer portions, said utensil operable to be heated to a temperature for frying, and comprising:
   a generally plate-like structure having a generally planar, upper, open cooking surface, and a lower heating surface;
   image-transferring means for transferring an image to the fried foodstuff, said image-transferring means including at least one groove provided on said generally planar upper surface so that a surrounding portion of said generally planar upper surface completely surrounds said image-transferring means and cooperates therewith for frying the central and outer portions of said foodstuff, with the central foodstuff segment positioned on said image-transferring means and the outer foodstuff segment on the surrounding portion of said generally planar upper surface, so as to impart an image of different discolorations to the central segment of said foodstuff through differential heating of different parts of said central foodstuff segment in contact with respective different parts of said image-transferring means formed by said at least one groove.

2. A cooking utensil as claimed in claim 1 wherein said generally planar upper surface has a normal; and said at least one groove has a sidewall which is tapered at an angle of about 7° from said normal.

3. A cooking utensil as claimed in claim 1 wherein said plate-like structure is a metal, which metal has a melting point about 1,000° F.

4. A cooking utensil as claimed in claim 1 wherein said plate-like structure is aluminum.

5. A cooking utensil as claimed in claim 1 wherein said generally planar upper surface of said plate-like structure has a perimeter and said plate-like structure further comprises a sidewall extending from said generally planar upper surface at said perimeter, said sidewall being spaced from said image-transferring means by said surrounding portion of the generally planar upper surface of said plate-like structure.

6. A cooking utensil as claimed in claim 1 wherein said image transferring means has a plurality of grooves.

7. A cooking utensil as claimed in claim 6 wherein at least two of said plurality of grooves intersect.

8. A cooking utensil as claimed in claim 1 wherein said groove has a length and a bottom at a depth below said generally planar upper surface, which groove bottom depth varies along the groove length.

9. A cooking utensil as claimed in claim 1 wherein said groove has a length and defines an opening of preselected size in said generally planar upper surface, which groove opening varies in size along the groove length.

10. A cooking utensil to provided contoured impressions on a fried foodstuff having central and outer portions, said utensil operable to be heated to a temperature for frying, and comprising:

a generally plate-like structure having a generally planar, upper, open cooking surface, and a lower heating surface;

image-transferring means for transferring an image to the fried foodstuff, said image-transferring means including a top surface raised above the generally planar upper surface and at least one groove provided on said top surface, with a surrounding portion of said generally planar upper surface completely surrounding said image-transferring means and cooperating therewith for frying the central and outer portions of said foodstuff, with the central foodstuff segment positioned on said image-transferring means and the outer foodstuff segment on the surrounding portion of said generally planar upper surface, so as to impart an image of different discoloration to the central foodstuff segment through differential heating of different parts of said central foodstuff segment in contact with respective different parts of said image-transferring means formed by said groove.

11. A cooking utensil as claimed in claim 10 wherein said at least one groove has a length and a bottom at a depth below said generally planar upper surface, which groove bottom depth varies along the groove length.

12. A cooking utensil as claimed in claim 10 wherein said at least one groove has a length and defines an opening in said generally planar upper surface, said opening varying in size along the groove length.

13. A cooking utensil as claimed in claim 10 wherein said generally planar upper surface of said plate-like structure has a perimeter and said plate-like structure further comprises a sidewall extending from said generally planar upper surface at said perimeter, said sidewall being spaced from said image-transferring means by said surrounding portion of the generally planar upper surface of said plate-like structure.

14. A cooking utensil as claimed in claim 10 wherein said image-transferring means has a plurality of grooves.

15. A cooking utensil as claimed in claim 14 wherein at least two of said plurality of grooves intersect.

* * * * *